No. 812,218. PATENTED FEB. 13, 1906.
L. P. LOWE.
GAS PURIFIER.
APPLICATION FILED NOV. 7, 1904.
2 SHEETS—SHEET 1.
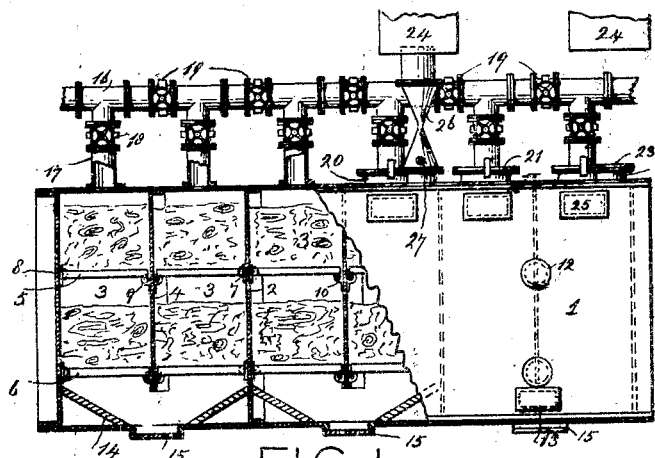
FIG. 1
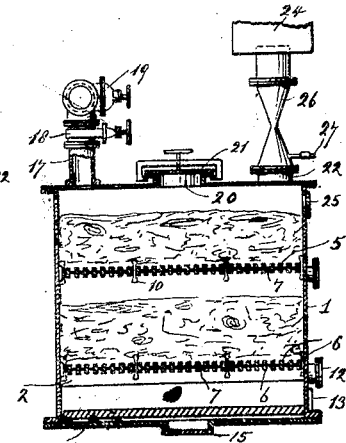
FIG. 2
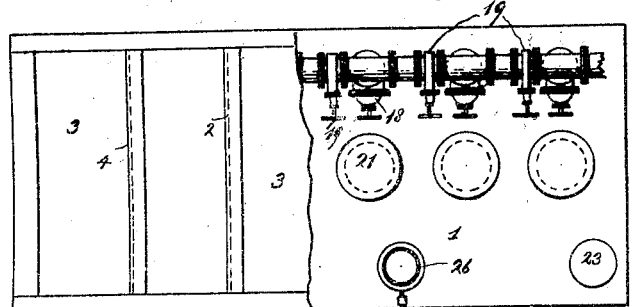
FIG. 3
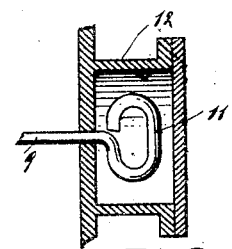
FIG. 4
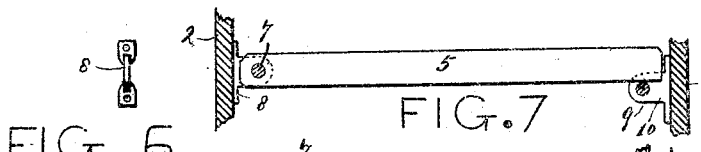
FIG. 7
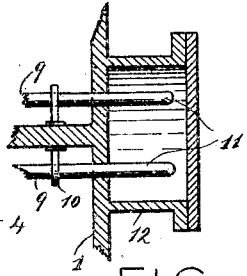
FIG. 5
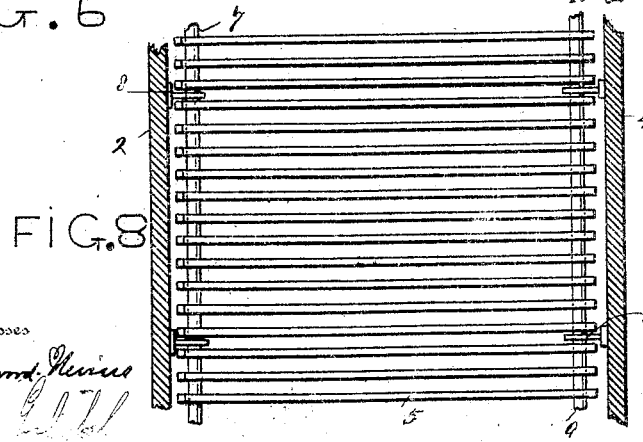
FIG. 6
FIG. 8
Witnesses
Inventor
L. P. Lowe
By
F. M. Wright
Attorney No. 812,218.
PATENTED FEB. 13, 1906.
L. P. LOWE.
GAS PURIFIER.
APPLICATION FILED NOV. 7, 1904.
2 SHEETS—SHEET 2.
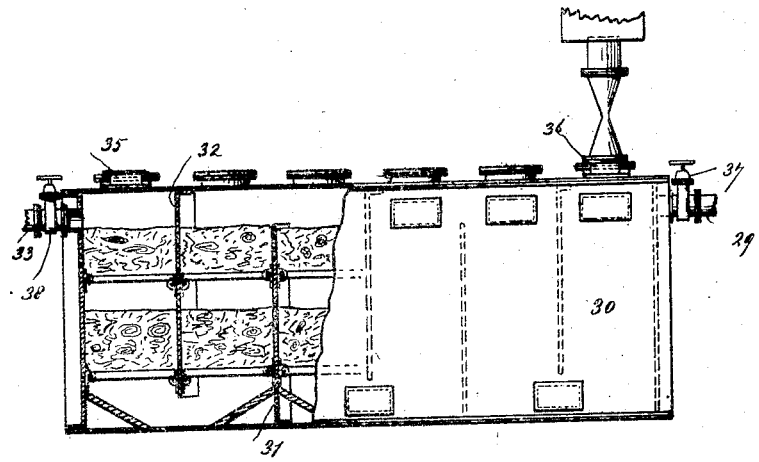
FIG. 9
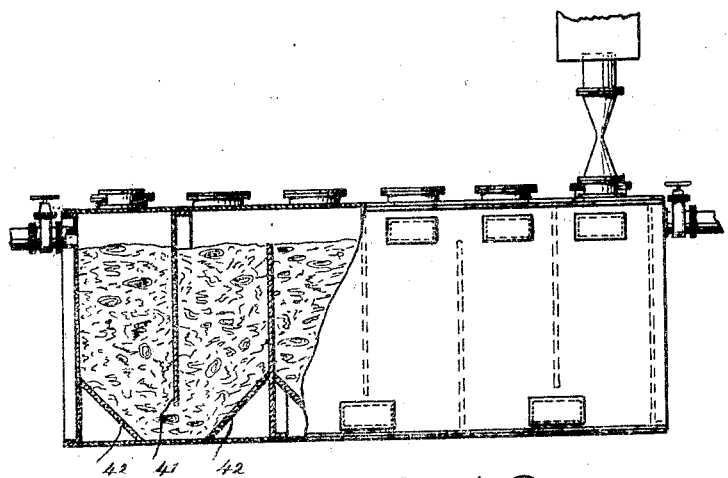
FIG. 10
FIG. 11
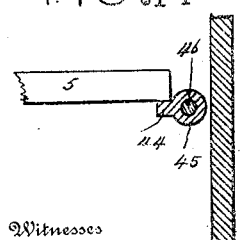
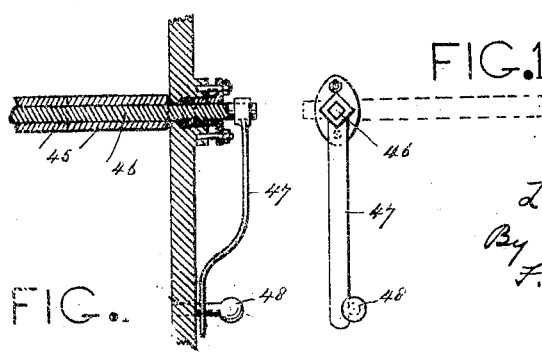
FIG. 13
Witnesses
Inventor
L. P. Lowe
By
Attorney

UNITED STATES PATENT OFFICE.

LEON P. LOWE, OF SAN FRANCISCO, CALIFORNIA.

GAS-PURIFIER.

No. 812,218.　　　Specification of Letters Patent.　　　Patented Feb. 13, 1906.

Application filed November 7, 1904. Serial No. 231,616.

*To all whom it may concern:*

Be it known that I, LEON P. LOWE, a citizen of the United States, residing at San Francisco, in the county of San Francisco and State of California, have invented certain new and useful Improvements in Gas-Purifiers, of which the following is a specification.

This invention relates to improvements in gas-purifiers, the object of the invention being to provide an apparatus of this character which shall be simple and inexpensive in construction and convenient and effective in operation.

Gas-purifiers in general use entail considerable labor and expense in removing the oxid of iron or other purifying material, and especially in large plants, this expense and labor being entailed partly in removing the metallic cover which seals the gas in the purifier and partly in removing the purifying material from the trays and replenishing the same. Moreover, they are objectionable in that during the processes of revivifying and cleaning the purifier the apparatus cannot at the same time be used for the purification of gas.

The object of my present improvement is to provide an apparatus which will cheapen the construction by avoiding the use of expensive metallic covers, permitting the main body of the apparatus to be made entirely of wood, if desirable, and also in the pipe connections and operating-valves, which are of a cheaper form, which will avoid the labor of lifting these heavy covers, which will enable the material to be readily removed from any portion of the apparatus separately, which will allow of any section of the apparatus being cut out from the remainder for the purpose of cleaning, replenishing, or revivifying said section, the remainder of the apparatus being still in use, and which will provide more convenient means for so revivifying the oxid of iron or other purifying material.

In the accompanying drawings, Figure 1 is a broken side elevation of the apparatus. Fig. 2 is a vertical section of the same. Fig. 3 is a broken plan view of the same. Fig. 4 is a detail vertical section of the box for a bar-handle. Fig. 5 is a horizontal section of the same. Fig. 6 is a front view of one of the eyes for the pivot-rods. Fig. 7 is a vertical detail section showing one of the bars in side elevation. Fig. 8 is a plan view of the series of bars forming a tray. Fig. 9 is a broken side elevation of a modified form of the invention. Fig. 10 is a similar view of a further modification. Fig. 11 is a detail vertical section showing a modified construction of a retaining-bar of the bars of the trays. Fig. 12 is a vertical longitudinal section of the same. Fig. 13 is a front view of the handle thereof.

Referring to the drawings, 1 represents an oblong rectangular box or casing divided into chambers by vertical transverse walls 2. Each chamber is divided into two compartments 3 by a partition 4, extending to a point adjacent to the bottom of the box, but spaced therefrom, so that the two compartments of each chamber communicate underneath the partition 4.

5 6 represent upper and lower series of bars for supporting the purifying material. These bars are hinged at one end to rods 7, passing through eyes 8 on a wall 2, and at the other end they rest upon rods 9, which pass through eyes 10, secured to the sides of a partition 4. The ends of the rods 9 are formed with eyes 11, by which they can be withdrawn with a hook and are inclosed in air-tight boxes 12.

By providing a plurality of sets of bars one above the other a greater amount of purifying material can be used without danger of packing. Also any section of the bars 5 6 can be dropped and the material thereon dumped separately, and the material can be removed by a side door 13 at the bottom or by doors 15 in the bottom. Inclined false bottoms 14 are used to direct the material to the doors 13 15.

16 is a gas-pipe connected with each compartment 3 by a branch pipe 17, having therein a valve 18, and in the gas-pipe 16 are a number of valves 19, alternating with the branch pipes. In the top of each compartment is a charging-hole 20, closed by a cover 21, and in the first compartment of each chamber is an opening 22, closed by a cover 23, and over each such opening 22 is a chimney 24, extending through the roof. At the side of each compartment near the top is a door 25, by which access can be had to the compartment for raking or stirring the material therein.

The operation of the apparatus is as follows: The compartments having been supplied with a suitable quantity of oxid of iron or other purifying material resting upon the bars 5 6, all the valves 18 in the branch pipes 17 are opened and of the valves 19 in the gas-pipe alternate valves are closed—namely, those lying over the partitions 4, separating the two compartments of each chamber from each other. The other valves 19 are open. Gas being then permitted to flow through said gas-pipe, as from right to left, passes down through the first valve 18 on the right into the first compartment 3, through the purifying material therein, underneath the partition 4, up through the purifying material in the second compartment, through the second valve 18, then through the second valve 19, which is open, and so on in a zigzag course through the chambers, in each case passing down through the first compartment in each chamber and upward through the second compartment, the gas thus passing through the chambers in succession is purified. Thus if the purifying material be oxid of iron any sulfureted hydrogen in the gas passing through said oxid of iron is decomposed, forming with the oxid of iron sulfid of iron. When this process has been continued so long that the oxid of iron is no longer effective in purifying gas, it is necessary to revivify the oxid of iron, and this is done according to the well-known process by passing air through the sulfid of iron to convert it into oxid of iron and free sulfur. With my present apparatus this can be done with the material in one chamber at a time without interfering with the action of the remaining chambers. For instance, suppose it is desired to revivify the material in the second chamber, containing the third and fourth compartments. Then the third and fourth valves 18, leading to these compartments, are closed, cutting out the compartments from the system. The third valve 19, which was formerly closed, is now opened, so as to connect the first chamber with the third chamber in order that the process of purifying may go on undisturbed in the remaining chamber. The revivifying of the material in the second chamber is now accomplished by allowing air to enter the second compartment of said chamber either through the charging-hole 20 in the top of said compartment or through the door 25 at the top of the side wall and causing the air to pass down through the second compartment and up through the first—that is, in the reverse direction to that of the gas. This direction is advantageous, because thereby the revivification of the purifying material takes place more slowly and with a smaller development of heat. This operation is performed by joining to the opening 22 in the top of the first compartment a small movable jet-exhauster 26, connected to a flexible hose 27, supplied with steam from any suitable source. The cover of the opening 22 is removed, and the jet-exhauster is substituted therefor, the top of the exhauster entering the chimney 24. Then, steam being supplied, a suction is caused in the two compartments of the chamber, drawing air down through the second compartment and up through the first. By this means the sulfid of iron is converted into oxid of iron and free sulfur, thus providing a fresh supply of oxid of iron for purifying the gas. In this way each of the chambers in succession may be treated without affecting the other chambers.

In Fig. 9 is shown a modified form of apparatus embodying in part the novel features of my invention in which the gas is admitted by a conduit 29 to the end of the rectangular box 30, which is divided into chambers by walls 31, extending from the bottom to a point near the top, each chamber being divided into compartments by partitions 32, extending from the top to a point near the bottom. 33 is the outlet gas-pipe. The gas admitted by the inlet-pipe passes down through the first compartment, through the purifying material therein, around the bottom of the partition 32, up through the purifying material in the second compartment, and then over the wall 31 into the first compartment of the second chamber, and so on through the chambers in series. To revivify the purifying material, air may be admitted by an opening 35 to the last compartment of the series and passed through in the reverse direction into the first compartment and out through an opening 36. Suitable valves 37 38 are provided for controlling the gas.

In the further modification of the invention shown in Fig. 10 the trays are dispensed with and the material is laid upon the bottom of the chamber, being confined to the middle of the bottom underneath the partitions 41 by means of sloping false bottoms 42. In other respects the construction is the same as in the last-described modification.

While the gas-purifiers illustrated in Figs. 9 and 10 are inferior to the apparatus first described in regard to the extent to which adjustment may be made to conform to various required operations, yet they are sufficient in certain cases, or in large plants a number of them may be provided, some of which are out of use and undergoing revivification while the remainder are in use for the purpose of purifying the gas.

In the modification shown in Figs. 11, 12, 13 the bars 5 and 6 are upheld by ribs 44 on sleeves 45, secured on rock-shafts 46, which extend through the side of the casing and are rocked by means of cranks 47, the ends of which rest against pins 48, inserted into the casing. By withdrawing these pins the shafts can be rocked through a right angle, as shown by dotted lines in Fig. 13, to lower the ribs and allow the bars forming the trap to drop to dump the material.

I claim—

1. A gas-purifier comprising a casing divided vertically into a horizontal series of chambers, and having connections at the top whereby the gas can be passed in succession through the chambers, each chamber having a vertical partition dividing it into two compartments connected at the bottom, and a door at the bottom of each chamber opposite to the vertical partition therein, substantially as described.

2. A gas-purifier comprising a casing divided vertically into a horizontal series of chambers, and having connections at the top whereby the gas can be passed in succession through the chambers, each chamber having a vertical partition dividing it into two compartments connected at the bottom, movable supports in each compartment for purifying material, and a door at the bottom of each chamber opposite to the vertical partition therein, substantially as described.

3. A gas-purifier comprising a casing divided vertically into a horizontal series of chambers, each chamber having a vertical partition dividing it into two compartments connected at the bottom, a pipe extending over, and parallel with said chambers, a valved connection from said pipe to each chamber, a valve in the pipe over each partition, movable supports in each compartment for purifying material, and an opening for removing the material from the bottom of each chamber, substantially as described.

In witness whereof I have hereunto set my hand in the presence of two subscribing witnesses.

L. P. LOWE.

Witnesses:
 FRANCIS M. WRIGHT,
 BESSIE GORFINKEL.